United States Patent
Lima et al.

(10) Patent No.: US 11,370,191 B2
(45) Date of Patent: Jun. 28, 2022

(54) CHANGING A DENSITY OF A NANOFIBER SHEET USING AN EDGED SURFACE

(71) Applicant: Lintec of America, Inc., Richardson, TX (US)

(72) Inventors: Marcio D. Lima, Richardson, TX (US); Julia Bykova, Richardson, TX (US)

(73) Assignee: LINTEC OF AMERICA, INC., Richardson, TX (US)

( * ) Notice: Subject to any disclaimer, the term of this patent is extended or adjusted under 35 U.S.C. 154(b) by 191 days.

(21) Appl. No.: 16/044,739

(22) Filed: Jul. 25, 2018

(65) Prior Publication Data

US 2019/0047247 A1 Feb. 14, 2019

Related U.S. Application Data

(60) Provisional application No. 62/542,355, filed on Aug. 8, 2017.

(51) Int. Cl.
*B32B 5/12* (2006.01)
*C01B 32/168* (2017.01)
(Continued)

(52) U.S. Cl.
CPC .............. *B32B 5/12* (2013.01); *C01B 32/162* (2017.08); *C01B 32/168* (2017.08); *B32B 5/14* (2013.01); *B32B 5/142* (2013.01); *B32B 9/007* (2013.01); *B32B 9/047* (2013.01); *B32B 2305/10* (2013.01); *B82Y 30/00* (2013.01);
(Continued)

(58) Field of Classification Search
CPC .. B32B 5/12; B32B 5/14; B32B 5/142; B32B 5/145; B32B 9/007; B32B 9/047; B32B 2305/10; B82Y 30/00; B82Y 40/00; C01B 32/162; D06M 2101/40
USPC ........... 977/742, 762; 442/327; 428/98, 114, 428/151, 170, 171, 218, 292
See application file for complete search history.

(56) References Cited

U.S. PATENT DOCUMENTS

| 3,402,468 A | 9/1968 | Kiss et al. |
| 2008/0170982 A1* | 7/2008 | Zhang ................. B29C 48/0019 423/447.3 |

(Continued)

FOREIGN PATENT DOCUMENTS

| CN | 106044739 | 10/1916 |
| CN | 106044739 | 10/2016 |

(Continued)

OTHER PUBLICATIONS

Zhang, "Strong and Conductive Dry Carbon Nanotube Films by Microcombing," Small Journal, May 4, 2015 (Year: 2015).*
(Continued)

*Primary Examiner* — Matthew D Matzek
(74) *Attorney, Agent, or Firm* — Greenblum & Bernstein, P.L.C.

(57) ABSTRACT

A density of a nanofiber sheet can be changed using an edged surface, and in particular an arcuate edged surface. As described herein, a nanofiber sheet is drawn over (and in contact with) an arcuate edged surface. Depending on whether the arcuate surface facing a direction opposite the direction in which the nanofiber sheet is being drawn is convex or concave determines whether the nanofiber sheet density is increased relative to the as-drawn sheet or decreased relative to the as-drawn sheet.

7 Claims, 6 Drawing Sheets

(51) Int. Cl.
  *C01B 32/162* (2017.01)
  *B82Y 40/00* (2011.01)
  *B32B 5/14* (2006.01)
  *B32B 9/04* (2006.01)
  *B32B 9/00* (2006.01)
  *C01B 32/159* (2017.01)
  *B82Y 30/00* (2011.01)

(52) U.S. Cl.
  CPC ............. *B82Y 40/00* (2013.01); *C01B 32/159* (2017.08); *C01B 2202/02* (2013.01); *C01B 2202/06* (2013.01); *C01B 2202/08* (2013.01)

(56) References Cited

U.S. PATENT DOCUMENTS

| | | |
|---|---|---|
| 2009/0208708 A1 | 8/2009 | Wei et al. |
| 2012/0205834 A1 | 8/2012 | Lemaire et al. |
| 2016/0059517 A1 | 3/2016 | Dhakate et al. |
| 2018/0052336 A1 | 2/2018 | Huynh et al. |

FOREIGN PATENT DOCUMENTS

| | | |
|---|---|---|
| JP | 2008-523254 | 7/2008 |
| JP | 2009-535530 | 10/2009 |
| JP | 2016-191173 | 11/2016 |
| WO | 2007/015710 | 2/2007 |
| WO | 2014/069153 | 5/2014 |

OTHER PUBLICATIONS

International Preliminary Report on Patentability received for PCT Application No. PCT/US2018/043630, dated Feb. 20, 2020. 9 pages.
Liwen Zhang et al., "Microcombing enables high-performance carbon nanotube composites", 2016, Composites Science and Technology, 123, Elsevier Ltd., pp. 92-98.
Liwen Zhang et al., "Strong and Conductive Dry Carbon Nanotube Films by Microcombing", 2015, Small, vol. 11, Issue 31, pp. 3830-3836.
Takeda et al., "Study on Cleaving Mechanism of Silicon Wafer by Laser Beam Irradiation", 2009, Proc. Leading Edge Manufacturing in 21st Century (5), The Japan Society of Mechanical Engineers, pp. 589-592.
Yu, et al. "Investigation of microcombing parameters in enhancing the properties of carbon nanotube yarns", Nov. 15, 2017, Materials & Design, vol. 134, pp. 181-187.
International Search Report with Written Opinion received in U.S. PCT Application No. PCT/US18/43630, dated Oct. 5, 2018, 15 pages.
The Extended European Search Report dated Feb. 25, 2021 issued in European Patent Application No. 18844927.6-1105.
Communication pursuant to Article 94(3) EPC dated Nov. 30, 2021 issued in European Application No. 18844927.6-1105 indicating allowability.
Notice of Allowance dated Dec. 24, 2021 issued in Japanese Application No. 2020-507112 along with corresponding English translation.
Office Action dated Apr. 9, 2021 issued in Japanese patent application No. 2020-507112 with an English translation.
Zhang Liwen et al., "Strong and Conductive Dry Carbon Nanotube Films by Microcombing", small-journal.com, 2015, p. 1-p. 7, URL, DOI:10.1002/small.201500111.

* cited by examiner

CHANGING A DENSITY OF A NANOFIBER SHEET USING AN EDGED SURFACE

RELATED APPLICATIONS

This application claims priority under 35 USC § 119(e) to U.S. Provisional Patent Application No. 62/542,355 entitled "Changing a Density of a Nanofiber Sheet Using an Edged Surface," filed on Aug. 8, 2017, which is incorporated by reference herein in its entirety.

TECHNICAL FIELD

The present disclosure relates generally to nanofiber sheet fabrication. Specifically, the present disclosure relates to changing a density of a nanofiber sheet using an edged surface.

BACKGROUND

Nanofiber forests, composed of both single wall and multiwalled nanotubes, can be drawn into nanofiber ribbons or sheets. In its pre-drawn state, the nanofiber forest comprises a layer (or several stacked layers) of nanofibers that are parallel to one another and perpendicular to a surface of a growth substrate. When drawn into a nanofiber sheet, the orientation of the nanofibers changes from perpendicular to parallel relative to the surface of the growth substrate. The nanotubes in the drawn nanofiber sheet connect to one another in an end-to-end configuration to form a continuous sheet in which a longitudinal axis of the nanofibers is parallel to a plane of the sheet (i.e., parallel to both of the first and second major surfaces of the nanofiber sheet). The nanofiber sheet can be treated in any of a variety of ways, including spinning the nanofiber sheet into a nanofiber yarn.

SUMMARY

Example 1 is a nanofiber sheet drawn from a nanofiber sheet source by a drawing mechanism and densified using an edged surface, the nanofiber sheet comprising: a first section of the nanofiber sheet disposed between the nanofiber sheet source and a first side of the edged surface, the first section having a first density; a second section of the nanofiber sheet disposed between the first side of the edged surface and the drawing mechanism, the second section have a second density different from the first density; and a transition section of the nanofiber sheet disposed between the first section and the first side of the edged surface.

Example 2 includes the subject matter of Example 1, wherein the second density of the second section is greater than the first density of the first section.

Example 3 includes the subject matter of Example 2, wherein the first section has a first width and the second section has a second width less than the first width.

Example 4 includes the subject matter of Example 1, wherein the second density of the second section is less than the first density of the first section.

Example 5 includes the subject matter of Example 4, wherein the first section has a first width and the second section has a second width that is greater than the first width.

Example 6 is a system for densifying a nanofiber sheet comprising: a nanofiber sheet source; a drawing mechanism configured for applying a tensile force to a nanofiber sheet drawn from the nanofiber sheet source; and at least one arcuate edge disposed between the nanofiber sheet source and the drawing mechanism.

Example 7 includes the subject matter of Example 6, wherein the at least one arcuate edge is concave and has a radius that is oriented 90°+/−30° relative to at least one of a plane of the nanofiber sheet, an axis of aligned nanofibers comprising the nanofiber sheet, or a direction in which the nanofiber sheet is drawn.

Example 8 includes the subject matter of Example 6, wherein the at least one arcuate edge is convex and has a radius that is oriented 90°+/−30° relative to at least one of a plane of the nanofiber sheet, an axis of aligned nanofibers comprising the nanofiber sheet, or a direction of draw.

Example 9 includes the subject matter of any of Examples 6-8, wherein the nanofiber sheet source further comprises: a substrate; and a nanofiber forest disposed on the substrate.

Example 10 includes the subject matter of any of Examples 6-9, wherein the drawing mechanism comprises a bobbin.

Example 11 includes the subject matter of any of Examples 6-10, wherein the at least one arcuate edge comprises a fracture surface of a cleaved silicon wafer.

Example 12 includes the subject matter of any of Examples 6-10, wherein the at least one arcuate edge comprises a blade.

Example 13 includes the subject matter of Example 12, wherein the blade is coated with polytetrafluorethylene.

Example 14 includes the subject matter of Example 13, wherein the blade is coated with polytetrafluorethylene.

Example 15 includes the subject matter of any of Examples 6-14, comprising: a first arcuate edge disposed to be in contact with a first major surface of the nanofiber sheet; and a second arcuate edge disposed to be in contact with a second major surface of the nanofiber sheet.

Example 16 includes the subject matter of any of Examples 6-15, wherein the first arcuate edge and the second arcuate edge are not coplanar with one another.

Example 17 includes the subject matter of any of Examples 6-16, wherein at least one of the first arcuate edge and the second arcuate edge are not coplanar with the drawing mechanism.

Example 18 includes the subject matter of any of Examples 6-17, wherein at least one of the first arcuate edge and the second arcuate edge are not coplanar with the nanofiber sheet source.

Example 19 includes the subject matter of any of Examples 6-18, wherein the arcuate edge transcribes a curve selected from a portion of a circle, a parabola or an ellipse.

Example 20 includes the subject matter of any of Examples 6-19, wherein the arcuate edge transcribes a curve along a radius extending from the nanofiber sheet source or from the drawing mechanism.

Example 21 includes the subject matter of any of Examples 6-20, wherein the arcuate edge transcribes a curve having a radius that perpendicular to a major surface of the nanofiber sheet.

Example 22 includes the subject matter of any of Examples 6-21, wherein the arcuate edge is curved in two different planes.

Example 23 includes the subject matter of any of Examples 6-22, wherein a curvature of the arcuate edge is adjustable.

Example 24 is a method for densifying a nanofiber sheet comprising: providing a nanofiber sheet having: a first density; a first major surface; and a second major surface opposite the first major surface; drawing the nanofiber sheet having the first density in a first direction so that at least one of the first major surface and the second major surface is drawn over and in contact with a corresponding at least one arcuate edge; and responsive to drawing the nanofiber sheet over and in contact with the at least one arcuate edge, changing the first density of the nanofiber sheet to a second density.

Example 25 includes the subject matter of Example 24, wherein changing the first density to the second density occurs at a location proximate to a line of contact between the nanofiber sheet and the at least one arcuate edge.

Example 26 includes the subject matter of Example 25, wherein the location proximate to the line of contact comprises a transition section.

Example 27 includes the subject matter of any of Examples 24-26, wherein the nanofiber sheet is a carbon nanotube nanofiber sheet.

Figure 1:
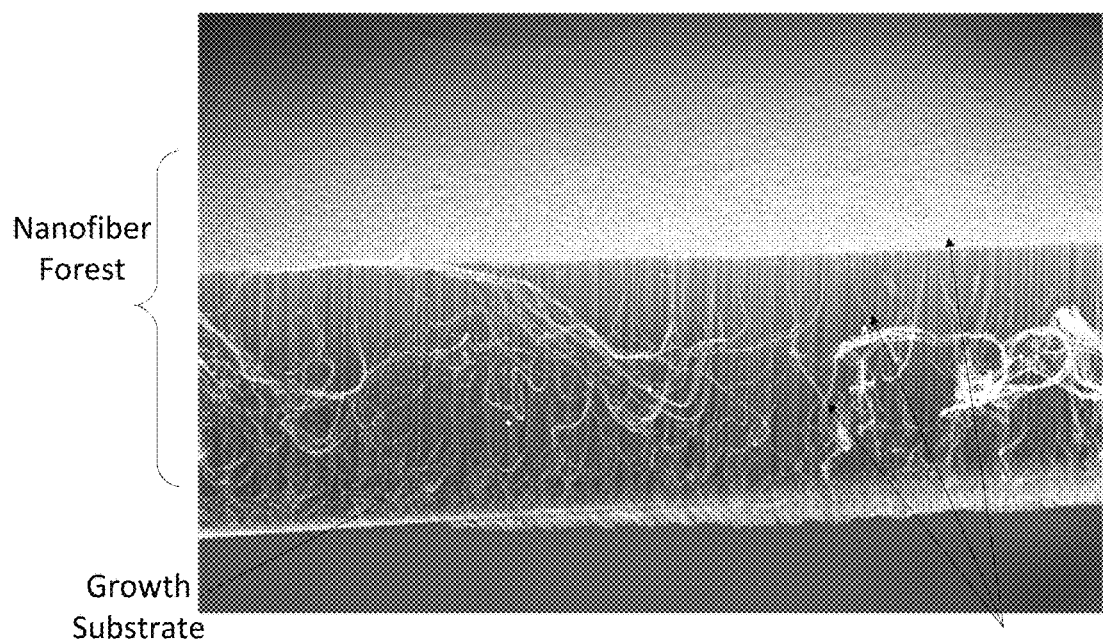
FIG. 1 illustrates an example forest of nanofibers on a substrate, in an embodiment.

The figures depict various embodiments of the present disclosure for purposes of illustration only. Numerous variations, configurations, and other embodiments will be apparent from the following detailed discussion.

DETAILED DESCRIPTION

Overview

There are a variety of methods that can be used to densify a nanofiber sheet. In some examples, a nanofiber sheet can be exposed to a solvent or other liquid. Upon removal of the solvent or other liquid, the nanofibers are drawn together thus increasing a density of the nanofiber sheet (whether measured in nanofibers per unit volume or mass per unit volume).

While liquid-based densification is effective and convenient, it does have some drawbacks. For example, nanofibers in an as-drawn, undensified sheet are often entangled. Also, nanofibers in an as-drawn, undensified sheet are not generally completely straight, but rather each nanofiber includes a variety of curves and changes in conformation or orientation along its length. The entanglements between nanofibers and the non-linear conformation of the nanofibers limits the degree to which a nanofiber sheet can be densified. While application and subsequent removal of a solvent from a nanofiber sheet does cause the nanofibers to draw closer together (in others words, densify), removal of the solvent is typically insufficient to disentangle and straighten the nanofibers en masse. Because the mechanical and electrical properties of nanofibers are highly anisotropic in a direction along a longitudinal axis of a nanofiber, nanofiber sheets, yarns, and other assemblies of nanofibers that retain nanofiber entanglements and non-linear conformations have mechanical and electrical properties that could be improved by disentangling and straightening the nanofibers.

"Microcombing" nanofiber sheets is one technique to disentangle and straighten the nanofibers. In this technique, a nanofiber sheet is drawn across an edge of a metallic, a using straight (i.e., having an edge that is a straight line) blade, such as a razor blade. The micron-scale irregularities in the edge of the blade act as a comb that helps to disentangle and straighten the nanofiber in a sheet. Once this microcombing is complete, the sheet can be densified using a solvent.

However, the combination of microcombing and liquid-densification is inefficient because it requires a two-step process to fully process a nanofiber sheet. Furthermore, the final density of a liquid-densified nanofiber sheet is partially a function of the density of the nanofiber sheet prior to being exposed to the liquid used in the liquid-based densification. In other words, the denser a nanofiber sheet is prior to liquid-based densification, the denser the nanofiber sheet will be after liquid-based densification.

Thus, in accordance with an embodiment of the present disclosure, techniques are described for changing a density of a nanofiber sheet using an edged surface, and in particular an arcuate edged surface. As described herein, a nanofiber sheet is drawn over (and in contact with) an arcuate edged surface. Depending on whether the arcuate surface is convex or concave (relative to the drawing direction of the nanofiber sheet) determines whether the nanofiber sheet density is increased relative to the as-drawn sheet or decreased relative to the as-drawn sheet.

Embodiments described herein produce many benefits. One benefit is the ability to straighten and align nanofibers within a nanofiber sheet, thus improving properties of the sheet (or yarn produced therefrom) and the ability to increase or decrease a density of the nanofiber sheet. Another benefit, for example, is the ability to tailor a width of a nanofiber sheet based on the dimensions and curvature of an edge surface that the nanofiber sheet is drawn over and in contact with. This enables a nanofiber sheet of a desired width to be produced, without removing material, regardless of a width of the as-provided nanofiber sheet. Another benefit, for example, is the ability to change a density of a nanofiber sheet both in terms of a number of nanofibers (or related parameter nanofiber mass) per unit of sheet width or sheet surface area and per unit of sheet volume. Changing the density of nanofibers per unit volume can, in turn, change an amount of a solvent and/or infiltration material imbibed by the sheet. In one example, a nanofiber sheet can be drawn so as to reduce its volumetric density, increasing a volume of interstitial spaces between fibers of the sheet and thus increasing an amount of infiltration material than can be imbibed by the sheet. Analogously, if a nanofiber sheet is drawn so as to increase its volumetric density, the interstitial spaces between fibers are decreased in size, thus reducing an amount of infiltration material than can be imbibed by the sheet. In another example, a nanofiber sheet can be drawn so as to increase its volumetric density, decreasing a volume of interstitial spaces between fibers of the sheet and thus decreasing an amount of infiltration material than can be imbibed by the sheet. In some embodiments, sheet density can be increased by greater than 50%, greater than 100% or greater than 200%. In other embodiments, sheet density can be decreased by greater than 10%, greater than 20% or greater than 50%. Similarly, the areal density of a nanofiber sheet can be increased or decreased, and in some cases the areal density may be increased by more than 10%, more than 20% or more than 50%. In other embodiments, the areal density may be decreased by more than 10%, more than 20% or more than 50%.

Applications of nanofiber sheets fabricated according to embodiments of the present disclosure can be used in a variety of applications, some of which include a sheet having a freestanding portion (i.e., a portion not in direct contact with a substrate). Example applications include, but are not limited to, filters, pellicles, electromagnetic interference (EMI) shields, and thermoacoustic speakers. In other applications, a freestanding portion of a nanofiber sheet (e.g., a sheet that has an unsupported center and a perimeter attached to a peripheral frame) may be used as a support for one or more other CNT sheets or materials including ceramics, metals, polymers, and films thereof.

A description of nanofiber forests and sheets precedes a description of techniques for densifying a nanofiber sheet using an edged surface.

Nanofiber Forests

As used herein, the term "nanofiber" means a fiber having a diameter less than 1 µm. While the embodiments herein are primarily described as fabricated from carbon nanotubes, it will be appreciated that other carbon allotropes, whether graphene, micron or nano-scale graphite fibers and/or plates, and even other compositions of nano-scale fibers such as boron nitride may be densified using the techniques described below. As used herein, the terms "nanofiber" and "carbon nanotube" encompass both single walled carbon nanotubes and/or multi-walled carbon nanotubes in which carbon atoms are linked together to form a cylindrical structure. In some embodiments, carbon nanotubes as referenced herein have between 4 and 10 walls. As used herein, a "nanofiber sheet" or simply "sheet" refers to a sheet of nanofibers aligned via a drawing process (as described in PCT Publication No. WO 2007/015710, and incorporated by reference herein in its entirety) so that a longitudinal axis of a nanofiber of the sheet is parallel to a major surface of the sheet, rather than perpendicular to the major surface of the sheet (i.e., in the as-deposited form of the sheet, often referred to as a "forest"). This is illustrated and shown in FIGS. 3 and 4, respectively.

The dimensions of carbon nanotubes can vary greatly depending on production methods used. For example, the diameter of a carbon nanotube may be from 0.4 nm to 100 nm and its length may range from 10 µm to greater than 55.5 cm. Carbon nanotubes are also capable of having very high aspect ratios (ratio of length to diameter) with some as high as 132,000,000:1 or more. Given the wide range of dimensional possibilities, the properties of carbon nanotubes are highly adjustable, or "tunable." While many intriguing properties of carbon nanotubes have been identified, harnessing the properties of carbon nanotubes in practical applications requires scalable and controllable production methods that allow the features of the carbon nanotubes to be maintained or enhanced.

Due to their unique structure, carbon nanotubes possess particular mechanical, electrical, chemical, thermal and optical properties that make them well-suited for certain applications. In particular, carbon nanotubes exhibit superior electrical conductivity, high mechanical strength, good thermal stability and are also hydrophobic. In addition to these properties, carbon nanotubes may also exhibit useful optical properties. For example, carbon nanotubes may be used in light-emitting diodes (LEDs) and photo-detectors to emit or detect light at narrowly selected wavelengths. Carbon nanotubes may also prove useful for photon transport and/or phonon transport.

In accordance with various embodiments of the subject disclosure, nanofibers (including but not limited to carbon nanotubes) can be arranged in various configurations, including in a configuration referred to herein as a "forest." As used herein, a "forest" of nanofibers or carbon nanotubes refers to an array of nanofibers having approximately equivalent dimensions that are arranged substantially parallel to one another on a substrate. FIG. 1 shows an example forest of nanofibers on a substrate. The substrate may be any shape but in some embodiments the substrate has a planar surface on which the forest is assembled. As can be seen in FIG. 1, the nanofibers in the forest may be approximately equal in height and/or diameter. In some cases the forest may be "as deposited" meaning that the nanotubes were formed on the substrate, or in other cases may have been transferred from the growth substrate onto a secondary substrate.

Figure 2A:
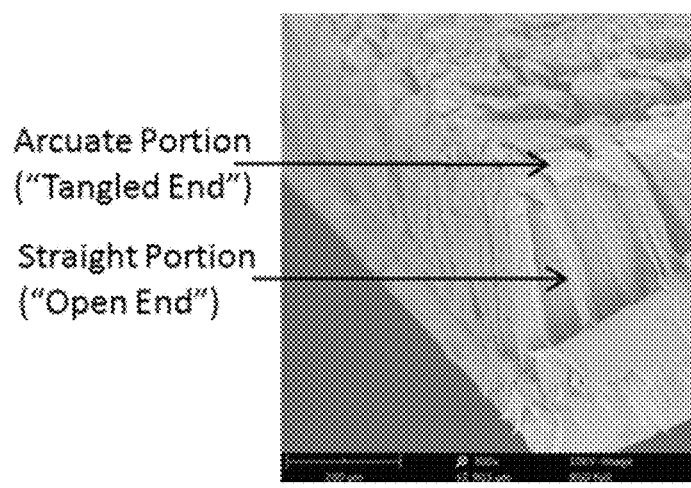
FIG. 2A is a perspective view scanning electron microscope (SEM) image of a carbon nanotube forest (alternatively referred to herein as a "layer") having a plurality of individual nanotubes, each of which includes a straight portion and an arcuate portion, in an embodiment.
Figure 2B:
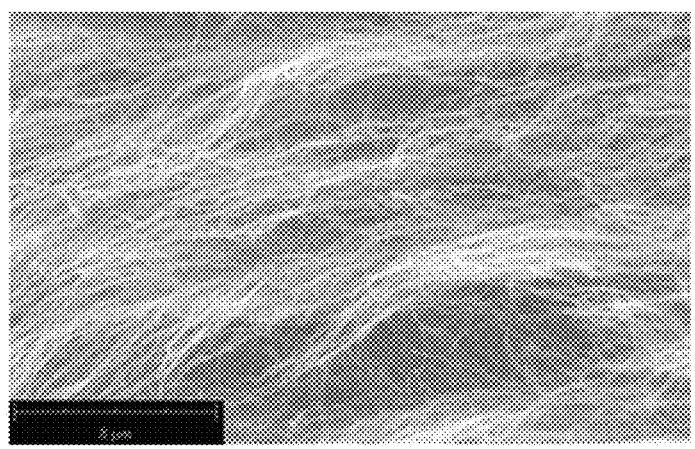
FIG. 2B is a plan view SEM image of a tangled portion composed of arcuate portions of individual nanofibers of a carbon nanotube forest, in an embodiment.

Some embodiments of nanofiber forests include nanofibers that have two portions in their as-deposited form. With reference to FIGS. 2A and 2B, one portion is a "straight portion" (that terminates in an "open end") that connects to, and is disposed near, a growth substrate. The other portion is "an arcuate portion" (also sometimes referred to as a "tangled end") that is disposed at an exposed surface of the nanofiber layer and that bends away from a longitudinal axis of the straight portion. These ends are indicated in the scanning electron microscope (SEM) image of FIG. 2A taken at a magnification of approximately 300× and an accelerating voltage of 10 kV. FIG. 2B is a top view of a nanofiber layer and shows the tangled nature of the arcuate portions.

Nanofiber forests as disclosed herein may be relatively dense. Specifically, the disclosed nanofiber forests may have a density of at least 1 billion nanofibers/cm$^2$. In some specific embodiments, a nanofiber forest as described herein may have a density of between 10 billion/cm$^2$ and 30 billion/cm$^2$. In other examples, the nanofiber forest as described herein may have a density in the range of 90 billion nanofibers/cm$^2$. The forest may include areas of high density or low density and specific areas may be void of nanofibers. The nanofibers within a forest may also exhibit inter-fiber connectivity. For example, neighboring nanofibers within a nanofiber forest may be attracted to one another by van der Waals forces. Regardless, a density of nanofibers within a forest can be increased by applying techniques described herein.

Methods of fabricating a nanofiber forest are described in, for example, PCT No. WO2007/015710, which is incorporated herein by reference in its entirety.

Various methods can be used to produce nanofiber precursor forests. For example, in some embodiments nanofibers may be grown in a high-temperature furnace. In some embodiments, catalyst may be deposited on a substrate, placed in a reactor and then may be exposed to a fuel compound that is supplied to the reactor. Substrates can withstand temperatures of greater than 800° C. or even 1000° C. and may be inert materials. The substrate may comprise stainless steel or aluminum disposed on an underlying silicon (Si) wafer, although other ceramic substrates may be used in place of the Si wafer (e.g., alumina, zirconia, SiO2, glass ceramics). In examples where the nanofibers of the precursor forest are carbon nanotubes, carbon-based compounds, such as acetylene may be used as fuel compounds. After being introduced to the reactor, the fuel compound(s) may then begin to accumulate on the catalyst and may assemble by growing upward from the substrate to form a forest of nanofibers. The reactor also may include a gas inlet where fuel compound(s) and carrier gasses may be supplied to the reactor and a gas outlet where expended fuel compounds and carrier gases may be released from the reactor. Examples of carrier gases include hydrogen, argon, and helium. These gases, in particular hydrogen, may also be introduced to the reactor to facilitate growth of the nanofiber forest. Additionally, dopants to be incorporated in the nanofibers may be added to the gas stream.

In a process used to fabricate a multilayered nanofiber forest, one nanofiber forest is formed on a substrate followed by the growth of a second nanofiber forest in contact with the first nanofiber forest. Multi-layered nanofiber forests can be formed by numerous suitable methods, such as by forming a first nanofiber forest on the substrate, depositing catalyst on the first nanofiber forest and then introducing additional fuel compound to the reactor to encourage growth of a second nanofiber forest from the catalyst positioned on the first nanofiber forest. Depending on the growth methodology applied, the type of catalyst, and the location of the catalyst, the second nanofiber layer may either grow on top of the first nanofiber layer or, after refreshing the catalyst, for example with hydrogen gas, grow directly on the substrate thus growing under the first nanofiber layer. Regardless, the second nanofiber forest can be aligned approximately end-to-end with the nanofibers of the first nanofiber forest although there is a readily detectable interface between the first and second forest. Multi-layered nanofiber forests may include any number of forests. For example, a multi-layered precursor forest may include two, three, four, five or more forests.

Nanofiber Sheets

Figure 3:
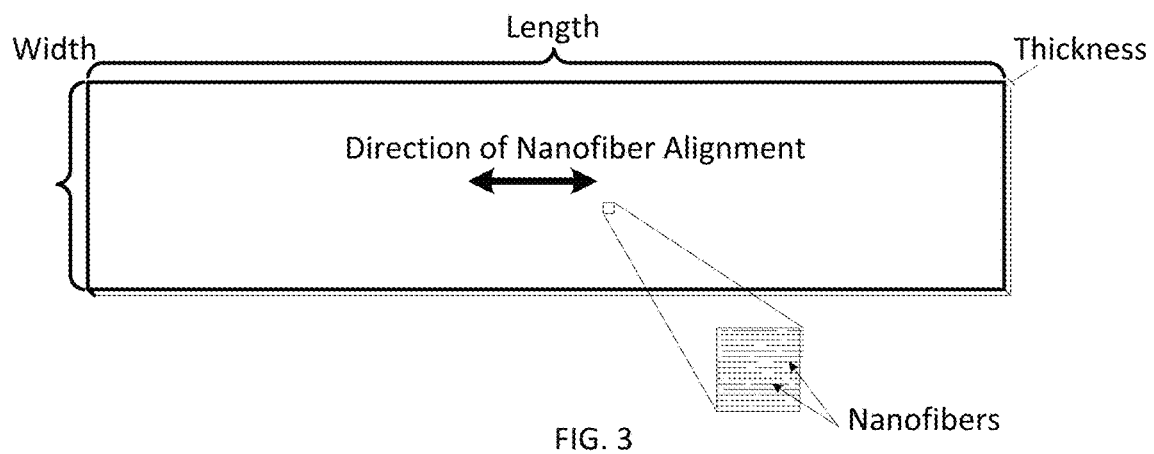
FIG. 3 is an illustration of a nanofiber sheet that identifies relative dimensions of the sheet and schematically illustrates nanofibers within the sheet aligned end-to-end in a plane parallel to a surface of the sheet, in an embodiment.

In addition to arrangement in a forest configuration, the nanofibers of the subject application may also be arranged in a sheet configuration. As used herein, the term "nanofiber sheet," "nanotube sheet," or simply "sheet" refers to an arrangement of nanofibers where the nanofibers are aligned end to end in a plane. An illustration of an example nanofiber sheet is shown in FIG. 3 with labels of the dimensions. In some embodiments, the sheet has a length and/or width that is more than 100 times greater than the thickness of the sheet. In some embodiments, the length, width or both, are more than $10^3$, $10^6$ or $10^9$ times greater than the average thickness of the sheet. A nanofiber sheet can have a thickness of, for example, between approximately 5 nm and 30 µm and any length and width that are suitable for the intended application. In some embodiments, a nanofiber sheet may have a length of between 1 cm and 10 meters and a width between 1 cm and 1 meter. These lengths are provided merely for illustration. The length and width of a nanofiber sheet are constrained by the configuration of the manufacturing equipment and not by the physical or chemical properties of any of the nanotubes, forest, or nanofiber sheet. For example, continuous processes can produce sheets of any length. These sheets can be wound onto a roll as they are produced.

As can be seen in FIG. 3, the axis in which the nanofibers are aligned end-to end is referred to as the direction of nanofiber alignment. In some embodiments, the direction of nanofiber alignment may be continuous throughout an entire nanofiber sheet. Nanofibers are not necessarily perfectly parallel to each other and it is understood that the direction of nanofiber alignment is an average or general measure of the direction of alignment of the nanofibers.

Nanofiber sheets may be assembled using any type of suitable process capable of producing the sheet. In some example embodiments, nanofiber sheets may be drawn from a nanofiber forest. An example of a nanofiber sheet being drawn from a nanofiber forest is shown in FIG. 4

Figure 4:
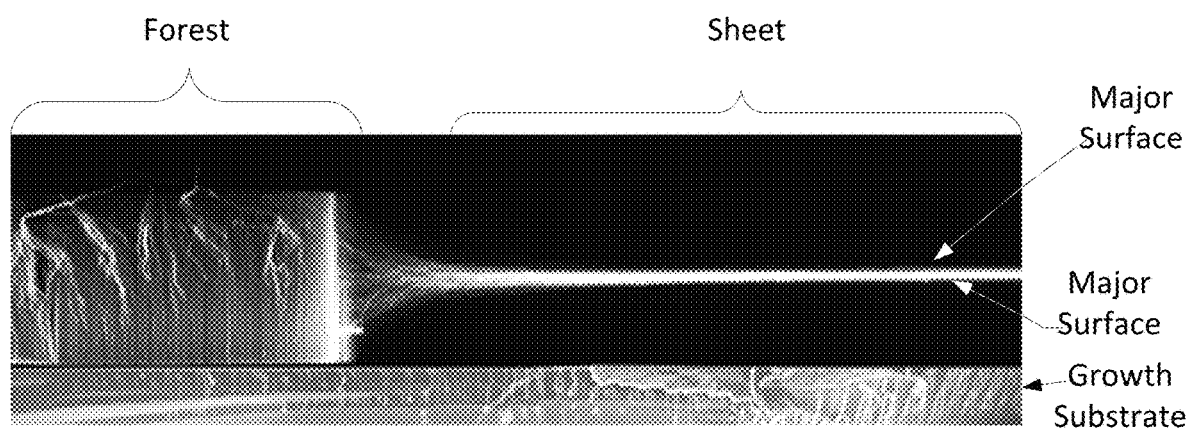
FIG. 4 is an image of a nanofiber sheet being laterally drawn from a nanofiber forest, the nanofibers aligning from end-to-end as schematically shown in FIG. 2A.

As can be seen in FIG. 4, the nanofibers may be drawn laterally from the forest and then align end-to-end to form a nanofiber sheet. In embodiments where a nanofiber sheet is drawn from a nanofiber forest, the dimensions of the forest may be controlled to form a nanofiber sheet having particular dimensions. For example, the width of the nanofiber sheet may be approximately equal to the width of the nanofiber forest from which the sheet was drawn. Additionally, the length of the sheet can be controlled, for example, by concluding the draw process when the desired sheet length has been achieved.

Nanofiber sheets have many properties that can be exploited for various applications. For example, nanofiber sheets may have tunable opacity, high mechanical strength and flexibility, thermal and electrical conductivity, and may also exhibit hydrophobicity. Given the high degree of alignment of the nanofibers within a sheet, a nanofiber sheet may be extremely thin. In some examples, a nanofiber sheet is on the order of approximately 10 nm thick (as measured within normal measurement tolerances), rendering it nearly two-dimensional. In other examples, the thickness of a nanofiber sheet can be as high as 200 nm or 300 nm. As such, nanofiber sheets may add minimal additional thickness to a component.

As with nanofiber forests, the nanofibers in a nanofibers sheet may be functionalized by a treatment agent by adding chemical groups or elements to a surface of the nanofibers of the sheet and that provide a different chemical activity than the nanofibers alone. Functionalization of a nanofiber sheet can be performed on previously functionalized nanofibers or can be performed on previously unfunctionalized nanofibers. Functionalization can be performed using any of the techniques described herein including, but not limited to CVD, and various doping techniques.

Nanofiber sheets, as drawn from a nanofiber forest, may also have high purity, wherein more than 90%, more than 95% or more than 99% of the weight percent of the nanofiber sheet is attributable to nanofibers, in some instances. Similarly, the nanofiber sheet may comprise more than 90%, more than 95%, more than 99% or more than 99.9% by weight of carbon.

Mechanically Changing Nanofiber Sheet Density

As described above, embodiments disclosed herein mechanically alter a density of a nanofiber sheet (or ribbon) while also disentangling and straightening the nanofibers therein. As described in more detail below, this is accomplished by drawing a nanofiber sheet over and in contact with an edged surface. Examples of edged surfaces include, but are not limited to, surgical blades, surgical blades coating with polytetrafluoroethylene (PTFE), and a fracture surface of a cleaved silicon wafer. In various embodiments, the contact surface of the edge can have a length of contact (in the direction of the axis of draw) with the nanofiber sheet of less than 5 mm, less than 1 mm, less than 500 µm, less than 250 µm or less than 100 µm. The contact surface can be smooth and, along the edge, may exhibit an absence of peaks or valleys of greater than, for example, 1 µm, 2 µm, 5 µm, 10 µm, 50 µm or 100 µm that are otherwise present in conventional razor blades. The aligned nanofibers of the nanofiber sheet may be oriented along the same axis as is the direction of draw which is also typically the same direction as the nanofiber sheet is pulled over the edged surface.

In particular, the PTFE coated surgical blades and the fracture surface of a cleaved silicon wafer can be used because of their uniform edged surfaces which produce uniform nanofiber sheets. This is distinct from the microcombing techniques described above, which rely on inhomogeneities and defects in an edge of a blade to straighten nanofibers in the sheet. Unlike embodiments of the present disclosure, the defects in a blade used in a traditional microcombing technique produce nanofiber sheets that vary in nanofiber density and defect density. These variations in the traditional technique include longitudinal tears in a major surface of the nanofiber sheet caused by some of the defects in the blade. While non-torn portions of the nanofiber sheet can be denser, longitudinal tears reduce the usefulness of a nanofiber sheet.

Embodiments herein also include using an edge of an arcuate surface. Vectors normal to points on the arcuate surface are parallel to major surfaces of nanofiber sheet. In other words, the direction of curvature of the arcuate surface can be thought of as a portion of a surface of a cylinder, in which a longitudinal axis of the cylinder is perpendicular to the major surfaces of the nanofiber sheet. The edge of the arcuate surface can, in embodiments, be partially or completely coplanar with a major surface of the nanofiber sheet. In one embodiment, by using an edged surface having a convex surface that faces the drawing direction of the nanofiber sheet, the nanofiber sheet expands in width. While the nanofibers in the sheet are straightened and disentangled, the number of nanofibers per unit volume of nanofiber sheet decreases because the width of the sheet increases. This can be useful for nanofiber sheets for any number of reasons. For example, a less dense nanofiber sheet with straight and disentangled nanofibers may be desired to be infiltrated with another material in a greater proportion than possible with a denser nanofiber sheet.

In another embodiment, by causing the edged surface to have a concave surface that faces the drawing direction of the nanofiber sheet, the nanofiber sheet, when drawn in contact with this surface contracts in width. This not only straightens and disentangles the nanofibers in the sheet, it also increases the number of nanofibers per unit volume of the sheet by decreasing the width of the sheet. This can lead to denser nanofiber yarns spun from the nanofiber sheet.

The curvature of the arcuate surface may be consistent or may vary along the length of the edge of the surface. In various embodiments, the curvature may be formed from portions of a circle, parabola or an ellipse, for example. In some cases the curvature is fixed while in others it may be adjustable. For example, a flexible curved blade can be kept in compression by two opposed clamp surfaces. The amount of curvature can be adjusted by reducing or expanding the distance between the clamp surfaces. Adjustments may be warranted for different sources of nanofiber sheets or by different properties in the finished sheet, such as variations in density. The curvature can also be adjusted in real time to assure quality and may be responsive to upstream or downstream analytical input, such as a measurement of downstream or upstream sheet density.

Figure 5A:
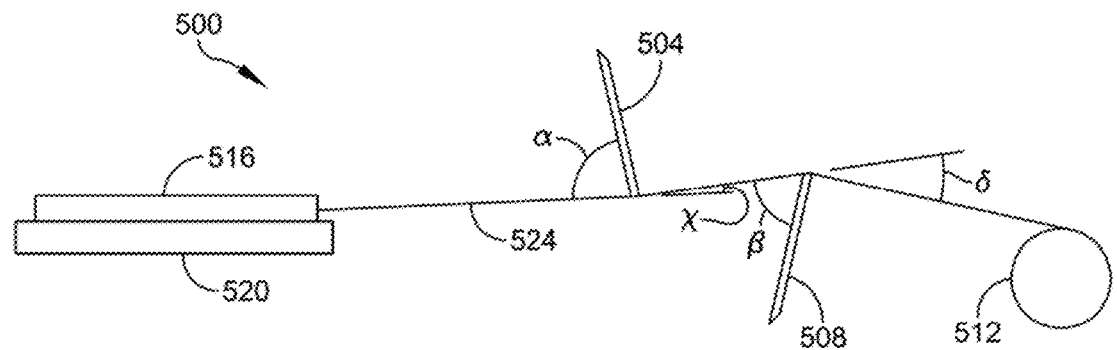
FIGS. 5A and 5B are side views of various configurations of a system for changing density of a nanofiber sheet using an edged surface, in embodiments.
Figure 5B:
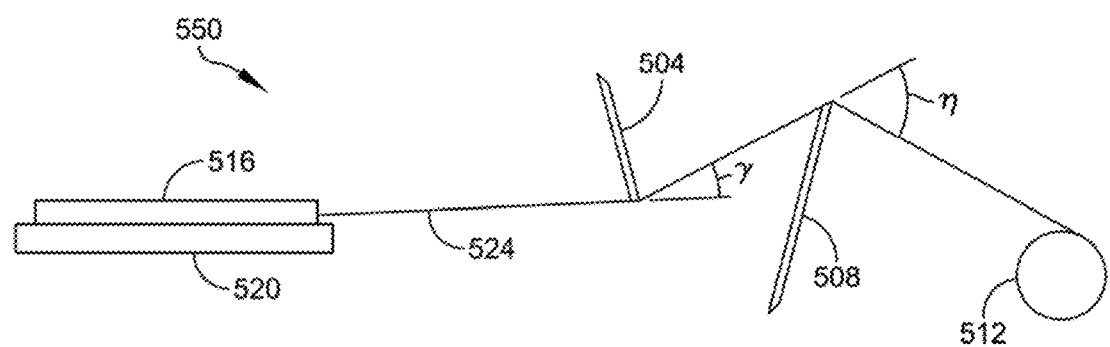

FIGS. 5A and 5B schematically illustrate various embodiments of systems used for the processing of nanofiber sheets, as described herein. It will be appreciated that the FIGS. 5A and 5B are side views and that the edged arcuate surfaces are depicted in these side views as planar for convenience only so as to emphasize other features of the systems. Top views in FIGS. 6B and 6C more clearly show the curved shape of the arcuate surfaces.

As shown in FIG. 5A, the example system 500 includes blades 504 and 508 and drawing mechanism 512. Also shown in FIG. 5A is a nanofiber forest 516, substrate 520, and nanofiber sheet 524, which are described in the context of the example system 500 to aid explanation of the operation of the system 500.

The nanofiber forest 516, described above, is disposed on the substrate 520. The substrate 520 can be growth substrate, like those described above or it can be a transfer substrate on which the nanofiber forest has been disposed after having been grown on the growth substrate. Regardless, the nanofiber forest is drawn into the nanofiber sheet 524. Techniques for growing and drawing nanofiber forests into a nanofiber sheet are described in PCT in Publication No. WO 2007/015710, which is incorporated by reference herein in its entirely.

Figure 6A:
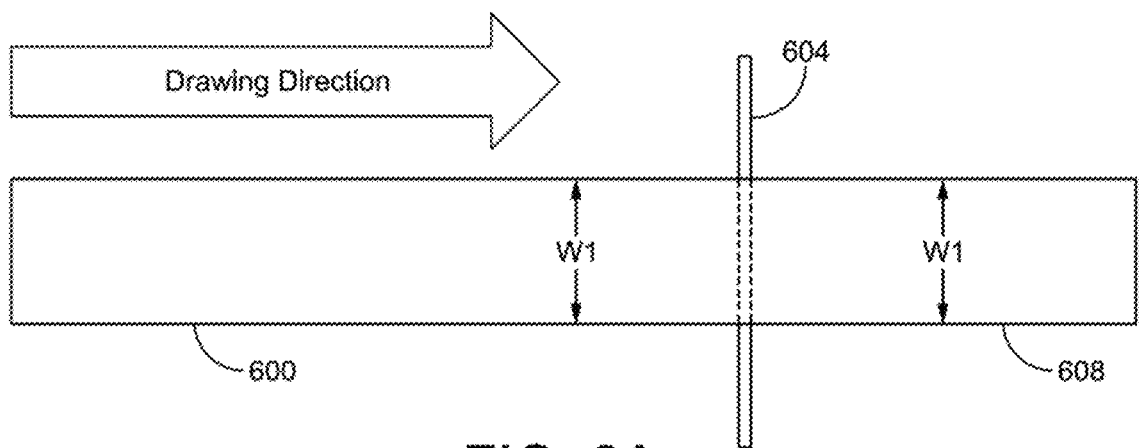
FIGS. 6A, 6B, and 6C are plan views of edged surfaces used to change density of a nanofiber sheet, in embodiments.
Figure 6B:
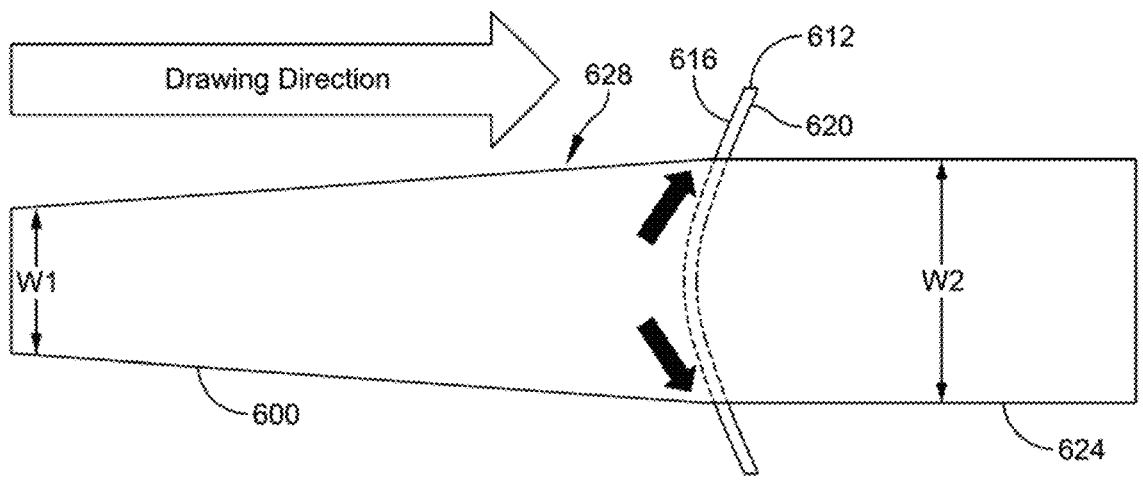
Figure 6C:
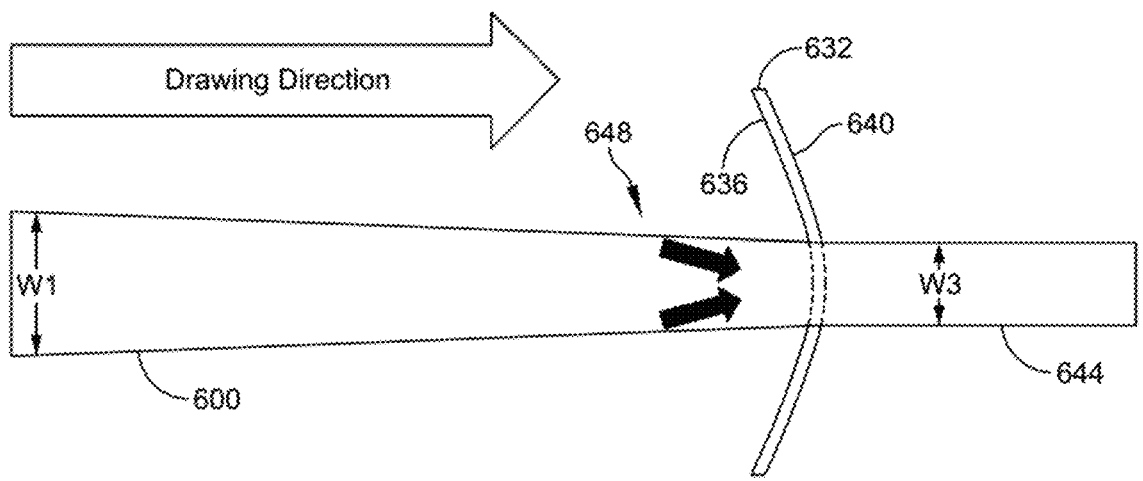

In the example system 500, the nanofiber sheet 524 is passed over, and in contact with, an arcuate edge of the blade 504 (example arcuate shapes of which are shown in FIGS. 6B and 6C) and an arcuate edge of the blade 508, and then wound on the drawing mechanism 512. Two blades 504 and 508 are shown in the example system 500. The blade 504 is in contact with a "top" major surface of the nanofiber sheet 524 and the blade 508 is in contact with a "bottom" major surface of the nanofiber sheet 524 opposite to the top major surface. In this way, nanofibers associated with both of the major surfaces are aligned and disentangled. Furthermore, in embodiments in which the edged surface of the blades 504, 508 is arcuate, more of the nanofiber sheet 524 has its density changed, as will be described in more detail in the context of FIGS. 6A, 6B, and 6C. In other embodiments, only one blade is used. In still other embodiments, more than two blades are used.

As described above, each of the blades 504 and 508 can be, for instance, a surgical blade, a PTFE coated surgical blade, a fracture surface of a cleaved silicon wafer, or combinations thereof. All of these options provide an edged surface against which the nanofiber sheet 524 can be drawn, thus altering the structure of the sheet through, for example, straightening and disentangling the nanofibers therein. Other types of blades 504, 508 that provide a uniform, edged surface may also be used in place of those specifically identified above.

The sharp edges of the blades 504, 508 are also helpful for at least another reason. Nanofiber sheets, like the nanofiber sheet 524, stick to most surfaces that they come into contact with. However, the nanofiber sheet 524 does not stick to the sharp edges of the blades 504, 508 because of their minimal surface area. This can be particularly true for those edge materials with low surface energy, like PTFE coated surfaces. Low surface energy materials can be those exhibiting large water drop angles, such as greater than 100°, greater than 105° or greater than 110° or having a low coefficient of friction, such as less than 0.3, less than 0.2, or less than 0.1.

Using a PTFE coated surgical blade (or other PTFE coated sharp edge) and the fracture surface of a cleaved silicon wafer have another benefit. In both of these embodiments, the edge placed in contact with the nanofiber sheet 524 is uniform, lacking the dents, chips, inhomogeneities and topical variation found in, for example, a standard blade or other sharp metallic surface. These topical variations can introduce a longitudinal tear or local density variation in the nanofiber sheet 524 as the sheet 524 is drawn over the topical variation. Tears and variations produce a less uniform nanofiber sheet 524 that has location-dependent variation in mechanical and electrical properties. As a result, providing an edge that is more uniform than a conventional steel edge is preferable.

The orientation and placement of the blades 504, 508 is selected to improve the ability of the edged surfaces of the blades 504, 508 to disentangle and straighten the nanofibers within the nanofiber sheet 524. This improvement is accomplished in two ways. First, the blades 504, 508 are placed so that a corresponding edged surface (or the blade itself) is at an angle to the corresponding major surface of the nanofiber sheet 524. The angle may be orthogonal or non-orthogonal. These angles are indicated in FIG. 5A as angles α and β. The angles α and β can be the same or different and can be within any of the following ranges measured with respect to the plane of the nanofiber sheet 524 as it approaches or as it leaves the blade 504, 508: from 10° to 90°; from 45° to 89°; form 45° to 60°; from 60° to 89°; from 85° to 89°; form 75° to 89°; from 80° to 90°.

Second, the blades 504, 508 are placed relative to one another to apply an additional tensile stress (or simply "tension") to a section of the nanofiber sheet 524 disposed between the blades 504, 508 beyond the tensile force provided by the drawing mechanism 512 (such as a motorized bobbin or other drawing mechanism). This added tension facilitates straightening and disentangling of the nanofibers in the nanofiber sheet 524, in addition to the straightening and disentangling provided by the edged surface of the blades 504, 508 alone. In some examples, the tensile stress is on the order of from 0.1 MPa to 1 MPa. In the example system 500, the placement of blade 504 relative to the blade 508 is indicated by angle χ. Similarly, tension is added by the placement of the blade 508 relative to the drawing mechanism 512, which is indicated by angle δ. The angle χ is the angle between the section of the nanofiber sheet 524 between the blade 504 and the blade 508 relative to the section of the nanofiber sheet 524 between the nanofiber forest 516 and the blade 504. Similarly, the angle δ is the angle between the section of the nanofiber sheet 524 between the blade 508 and the draw mechanism 512 relative to the section of the nanofiber sheet 524 between the blade 504 and the blade 508. In various embodiments, angles χ and δ can be, for example, greater than 1°, greater than 5θ, greater than 10°, greater than 20°, greater than 45°, less than 120°, less than 90° or less than 45°.

Turning briefly to FIG. 5B and the example system 550 depicted therein, it will be observed that the angles χ and δ of the system 500 are shallower (i.e., less acute or alternatively, closer to an angle of 0°) than corresponding angles γ and η shown in FIG. 5B. This is because the vertical displacement between the blades 504 and 508 and between the blade 508 and the drawing mechanism 512 have increased in the system 550 compared to the system 500. The increase in angles γ and η can thus increase tension applied to this section of the nanofiber sheet 524. This increased tension can increase the extent to which nanofibers in the nanofiber sheet 524 are straightened and aligned with one another.

Returning to the example system 500, the drawing mechanism 512 applies a tensile force to the nanofiber forest 516, thus drawing the nanofiber sheet 524 from the nanofiber forest 516 on the substrate 520. Examples of the drawing mechanism 512 include a motorized rotary mechanism, such as a bobbin. The drawing mechanism can provide a tensile or pulling force throughout an entire length of the nanofiber sheet, thus drawing the nanofiber sheet from the sheet source. In some examples, the tensile force is sufficient to draw the nanofiber sheet directly from a nanofiber forest on a substrate so that nanofibers from the nanofiber forest are removed from the substrate and progressively processed by the nanofiber sheet densification system. The tensile force can be constant or be varied by varying a torque applied to the drawing mechanism by a motor, spring, or other mechanism. The magnitude of the tensile force can also be used to influence an alignment between nanofibers of the yarn. Generally speaking, the greater the magnitude of the tensile force the higher a degree of alignment between nanofibers, between nanofibers and nanoparticles, and between nanoparticles. The tensile force applied by the drawing mechanism can be selected in coordination with the relative location of the blades 504, 508, as described above.

Arcuate Edged Surface

The effect on the nanofiber sheet of an arcuate edged surface of is described below in the context of FIGS. 6A-6G. A direction in which the nanofiber sheet is drawn is indicated in each of the FIGS. 6A-6G by a labeled arrow. FIGS. 6A to 6C illustrate embodiments in which a vector orthogonal to the arcuate surface is parallel (or antiparallel) to the drawing direction of the nanofiber sheet. FIGS. 6D to 6G illustrate embodiments in which the radius of the arcuate surface is perpendicular to the drawing direction of the nanofiber sheet and to the axis of the aligned nanofibers.

FIG. 6A illustrates an example in which a straight-edged surface is used to apply a force to the nanofibers of the nanofiber sheet. As shown, the section 600 of the nanofiber sheet that has yet to contact the edged surface 604 has a width W1 that is the same as the width of the section 608 that has been drawn over (i.e., in contact with) and drawn past the edged surface 604.

FIG. 6B illustrates an example in which an edged surface 612 used to apply a force to the nanofibers of the nanofiber sheet is arcuate and has a convex face 616 disposed toward the direction from which the nanofiber sheet 600 is being drawn. As shown, the nanofiber sheet section 600 in its as-drawn (or more generally, as-supplied) state has a width W1. As indicated in FIG. 6B, drawing the nanofiber sheet 600 over and in contact with the convex edged surface 616 causes the nanofiber sheet 600 to widen to a width W2 in the second section 624, where the width W2 is greater than the width W1. This second section 624 of the nanofiber sheet can be less dense than the section 600 of the nanofiber sheet in its as-supplied (or as-drawn) state. In some examples, this widening begins prior to the actual contact between the nanofiber sheet 600 and the convex surface 616. This is indicated in FIG. 6B as a transition section 628 that comprises a width that increases from W1 to W2. This transition section 628 (and others described below) can occur at a line of contact between the nanofiber sheet and the edged surface or proximate to the line of contact.

The result of mechanically changing the width of the nanofiber sheet from the width W1 at the as-supplied section 600 to the greater width W2 at the second section 624 has the effect of reducing the density of the second section to a density less than the density of the as-supplied section 600.

FIG. 6C illustrates a situation analogous to that depicted in FIG. 6B except that a concave face 636 of an edged surface 632 is disposed to face the direction from which the nanofiber sheet is drawn. Similar to the scenario depicted in FIG. 6B, the scenario depicted in FIG. 6C includes an as-supplied nanofiber sheet section 600 with a width W1. The width of the nanofiber sheet is reduced when drawn over the concave edged surface 632 oriented as shown in FIG. 6C (i.e., with the concave surface 636 disposed toward the drawing direction). This narrower section 644 of the nanofiber sheet has a width W3 that is less than the width W1. As also shown in FIG. 6C, the reduction in width can begin prior to actual contact between the nanofiber sheet and the concave edged surface 636, as indicated by the transition section 648.

The result of mechanically changing the width of the nanofiber sheet from the width W1 at the as-supplied section 600 to the narrow width W3 at the section 644 also has the effect of increasing the density of the section 644 to a density greater than the density of the as-supplied section 600.

In an embodiment, a nanofiber sheet drawn from a nanofiber forest (or other nanofiber sheet source) and processed according to embodiments described herein can be thought of as having three sections. The first section (e.g., section 600) has a density corresponding to the nanofiber sheet as drawn from a nanofiber forest or as provided from a nanofiber sheet source (e.g., a spool of nanofiber sheet). This first section is disposed between the source of the nanofiber sheet (not shown in FIGS. 6A-6C) and the arcuate edged surface (e.g., arcuate edged surface 612, 632). The second section has a density different from the first section—whether a lower density (e.g., section 624) or a higher density (e.g., section 644). This second section is disposed between the arcuate edged surface and a drawing mechanism (not shown). Another section is disposed between these first and second sections and is a transition between the two (e.g., sections 628, 648). This transition section has an intermediate density that is between the density of the first section and the second section. In some embodiments, the density of this transition section decreases or increases uniformly between the first section and the second section.

Figure 6D:
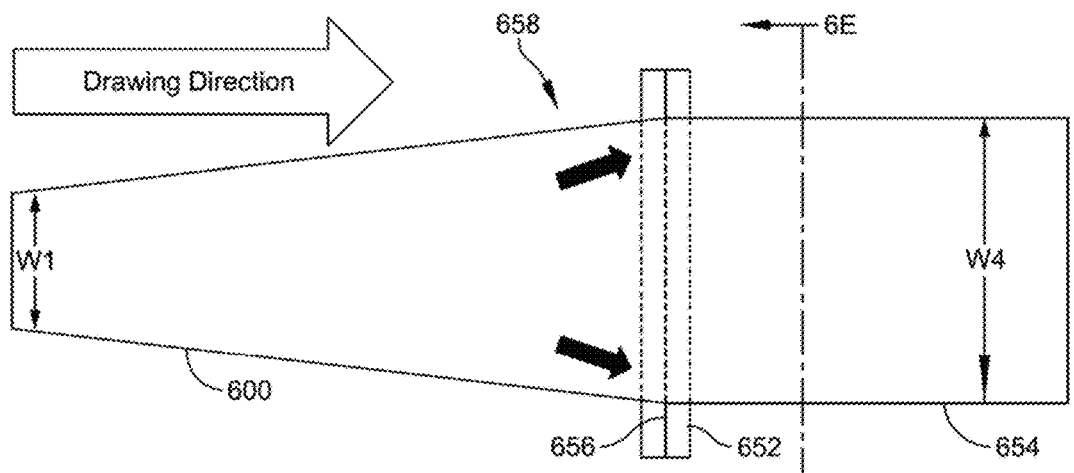
FIGS. 6D, 6E, 6F, and 6G are plan and cross-sectional views of an alternatively configured edged surface used to change density of a nanofiber sheet, in embodiments

FIGS. 6D to 6G illustrate an alternative configuration to those illustrated in FIGS. 6A to 6C in which an arcuate surface is configured and arranged so that the radius of the arcuate surface is substantially perpendicular to the direction in which the nanofiber sheet is drawn. In related embodiments, the radius of the arcuate surface can be oriented, either into or away from the direction of draw, at 0°-90°, 0°-80°, 0°-70°, 0°-60°, 20°-90°, 20°-70°, or 30°-90° from either the axis of draw or the axis of the aligned nanofibers, or both. FIG. 6D illustrates an embodiment in which an edge 656 of an arcuate surface 652 (such as a curved blade) is used to widen a width of the nanofiber sheet. Similar to the examples presented above, a nanofiber sheet section 600 in its as-drawn (or as-supplied) state has a width W1. The nanofiber sheet is drawn over and in contact with convex arcuate edge 656 of edged structure arcuate surface 652. The convex arcuate edge 656 causes the nanofiber sheet 600 to widen to a width W4 in the second section 654 of the nanofiber sheet, where the width W4 is greater than the width W1. As described above, the second section 654 can be less dense than the first section 600 of the nanofiber sheet in its as-supplied or as-drawn state. As also described in previous embodiments, in some examples the widening of the nanofiber sheet can begin prior to contact between the nanofiber sheet and the convex arcuate edge 656. This is indicated in FIG. 6D as transition zone 658 and by arrows on the nanofiber sheet within the transition zone 658. A cross-sectional view of FIG. 6D appears in FIG. 6E.

Figure 6E:
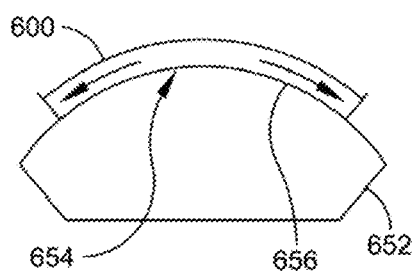
Figure 6F:
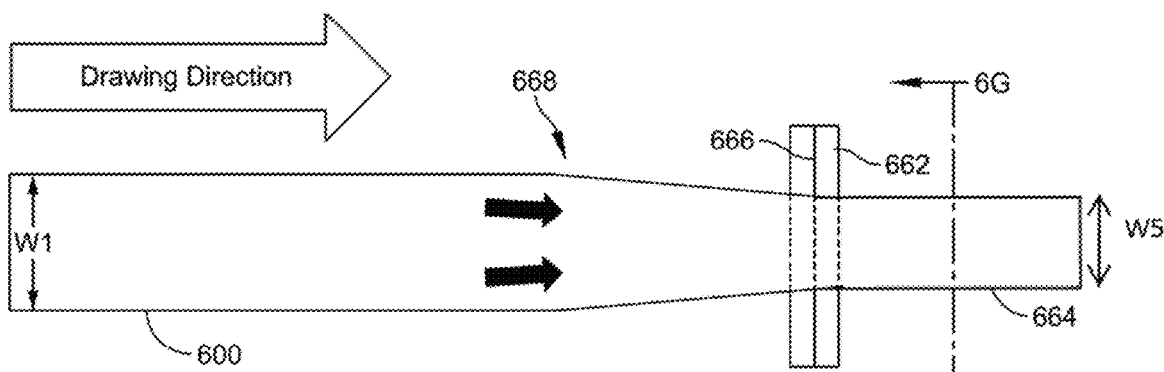
Figure 6G:

FIG. 6F illustrates an embodiment in which an edge 666 of a concave arcuate edge 662 is used to reduce a width of a nanofiber sheet from its as-drawn or as-supplied state. As above, the as-supplied nanofiber sheet section 600 has a width W1. This is drawn over and in contact with a convex edge 666 of a structure 662. While the entire structure 662 as shown in FIG. 6G is arcuate and concave, it will be appreciated that this is only one embodiment and that only the edge 666 need be convex and the structure 662 can be any shape (such as is shown in FIG. 6E for blade 652). Regardless, contact with the convex edge 666 causes the width W1 to be reduced to a width W5 that is less than the width W1 in a second section 664 of the nanofiber sheet. In examples, the second section 664 is denser than the as-supplied section 600. As with the previously described examples, the width reduction can occur in a transition section 668 that precedes contact between the edge 666 and the nanofiber sheet. This is indicated by arrows in FIGS. 6F and 6G. A cross-sectional view of FIG. 6F appears in FIG. 6G.

Example Method

Figure 7:
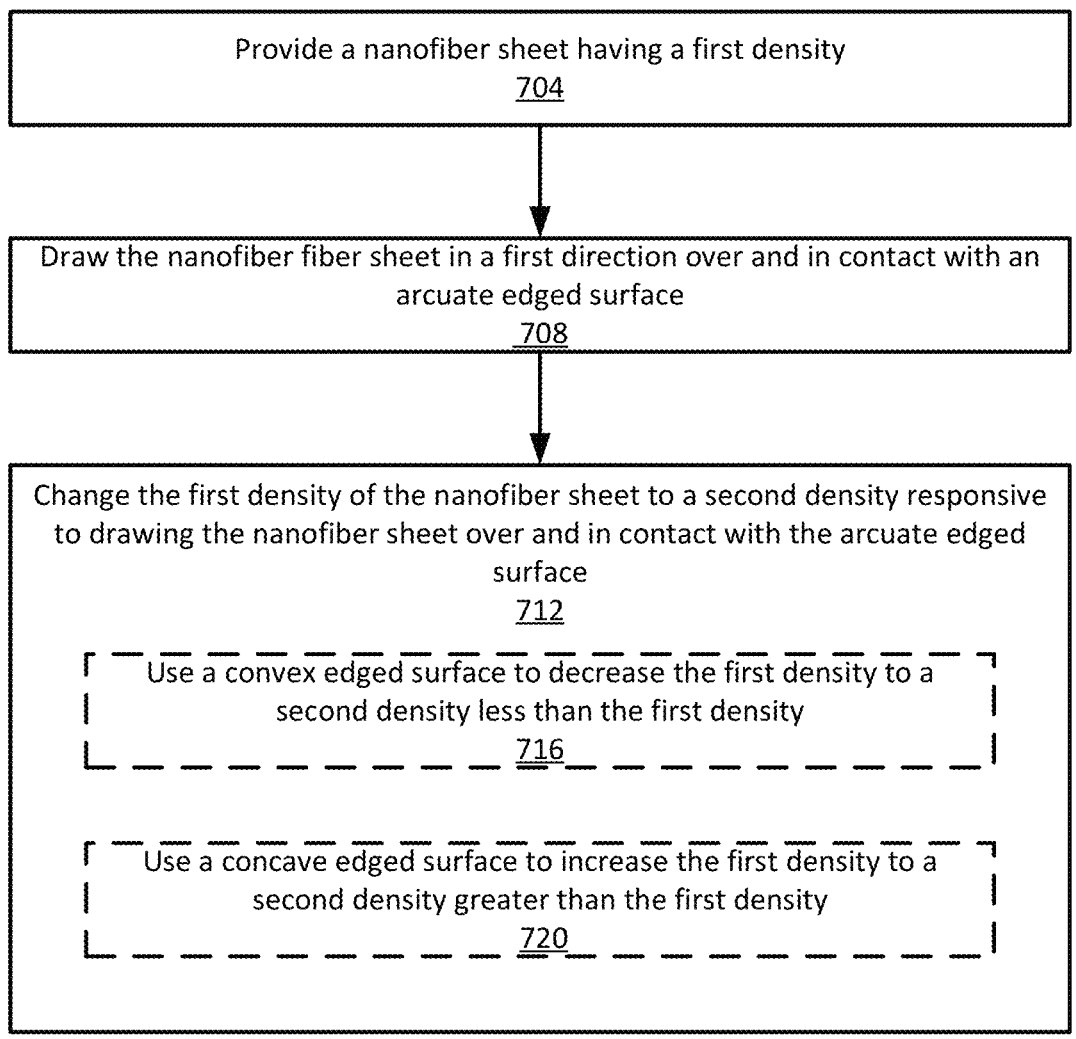
FIG. 7 is a method flow diagram for mechanically changing a density of a nanofiber sheet using an edged surface, in an embodiment.

FIG. 7 illustrates an example method 700 for mechanically changing a density of a nanofiber sheet, in an embodiment of the present disclosure. As described above, the method 700 begins by providing 704 a nanofiber sheet. The nanofiber sheet comprises a first density, and has a first major surface and a second major surface. The nanofiber sheet having the first density is drawn 708 over and in contact with at least one arcuate edged surface. This drawing 708 provides physical contact between at least one of the major surfaces of the nanofiber sheet and a corresponding edged surface. Responsive to the drawing 708, the first density of the nanofiber sheet changes 712 to a second density. Using a convex edged surface, the first density is decreased 716 to a second density less than the first density. Using a concave edged surface, the first density is increased 720 to a second density greater than the first density.

Further Considerations

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A nanofiber sheet drawn from a nanofiber sheet source by a drawing mechanism and having a modified density, the density of the nanofiber sheet being modified by drawing the nanofiber sheet source across and against an edge of a flexible arcuate surface, the nanofiber sheet comprising:
    a first section of the nanofiber sheet disposed between the nanofiber sheet source and a first side of the flexible arcuate surface facing the nanofiber sheet source,
    wherein a first width of the first section at the nanofiber sheet source and a second width at edge of the flexible arcuate surface are different from one another,
    wherein the first section includes
        a first portion that is adjacent to the nanofiber sheet source, the first portion having a first sheet density and a first volumetric density, and
        a second portion that is adjacent to the edge of the first side of the flexible arcuate surface, the second portion having a second sheet density and a second volumetric density, wherein the flexible arcuate surface, while the edge is in contact with the nanofiber sheet, is configured to bend from a first shape to a second shape forming the second sheet density and the second volumetric density, the first shape being linear from a top view and the second shape being one of a concave or convex shape from the top view, wherein a shape of a portion of the nanofiber sheet contacting the edge of the flexible arcuate surface conforms to a shape of the edge of the flexible arcuate surface, such that:

the second width of the first section of the nanofiber sheet is greater than the first width of the first section of the nanofiber sheet when the second shape is in the convex shape facing the drawing direction and the edge of the flexible arcuate surface has the convex shape, and the second width of the first section of the nanofiber sheet is lesser than the first width of the first section of the nanofiber sheet when the second shape is in the concave shape facing the drawing direction and the edge of the flexible arcuate surface has the concave shape; and a second section of the nanofiber sheet disposed between a second side of the flexible arcuate surface and the drawing mechanism, the second side being opposite of the first side, and the second section having a third sheet density at a starting portion immediately adjacent to the second side, the third sheet density being substantially identical to the second sheet density, and a third volumetric density at the starting portion different from the second volumetric density, wherein the first section transitions to the second section after contacting the edge of the flexible arcuate surface, such that the first section is adjacently connected to the second section, wherein contact points of the edge of the flexible arcuate surface on the nanofiber sheet divides the nanofiber sheet into the first section and the second section, and wherein a border of the nanofiber sheet that divides the first section and the second section has either the concave shape or the convex shape.

2. The nanofiber sheet of claim 1, wherein the third volumetric density is greater than the first volumetric density.

3. The nanofiber sheet of claim 2, wherein the third sheet density is greater than the first sheet density.

4. The nanofiber sheet of claim 2, wherein the third sheet density is less than the first sheet density.

5. The nanofiber sheet of claim 1, wherein the nanofibers of the second section are straightened and less tangled compared to nanofibers of the first section.

6. The nanofiber sheet of claim 1, wherein the nanofiber sheet is dry and unexposed to liquid in its entirety at all times.

7. The nanofiber sheet of claim 1, wherein the nanofiber sheet includes a third section that is rolled around the drawing mechanism, the third section being unexposed to any liquid at any time.

* * * * *